NATHAN W. ARAM
JESSE E. BROWN
*INVENTOR.*

BY [signature]

THEIR AGENT

Aug. 7, 1951 N. W. ARAM ET AL 2,563,448

SUBSCRIPTION TYPE SIGNALING SYSTEM

Filed April 9, 1949 4 Sheets-Sheet 2

NATHAN W. ARAM
JESSE E. BROWN
*INVENTOR.*

BY [signature]

THEIR AGENT

SUBSCRIPTION TYPE SIGNALING SYSTEM

NATHAN W. ARAM
JESSE E. BROWN
INVENTOR.
BY
THEIR AGENT

SUBSCRIPTION TYPE SIGNALING SYSTEM

Filed April 9, 1949 4 Sheets-Sheet 4

NATHAN W. ARAM
JESSE E. BROWN
*INVENTOR.*

BY Bruce G. Bickford

THEIR AGENT

Patented Aug. 7, 1951 2,563,448

UNITED STATES PATENT OFFICE 2,563,448

SUBSCRIPTION TYPE SIGNALING SYSTEM

Nathan W. Aram, Park Ridge, and Jesse E. Brown, Glencoe, Ill., assignors to Zenith Radio Corporation, a corporation of Illinois Application April 9, 1949, Serial No. 86,486

5 Claims. (Cl. 178—5.1)

Figure 1:
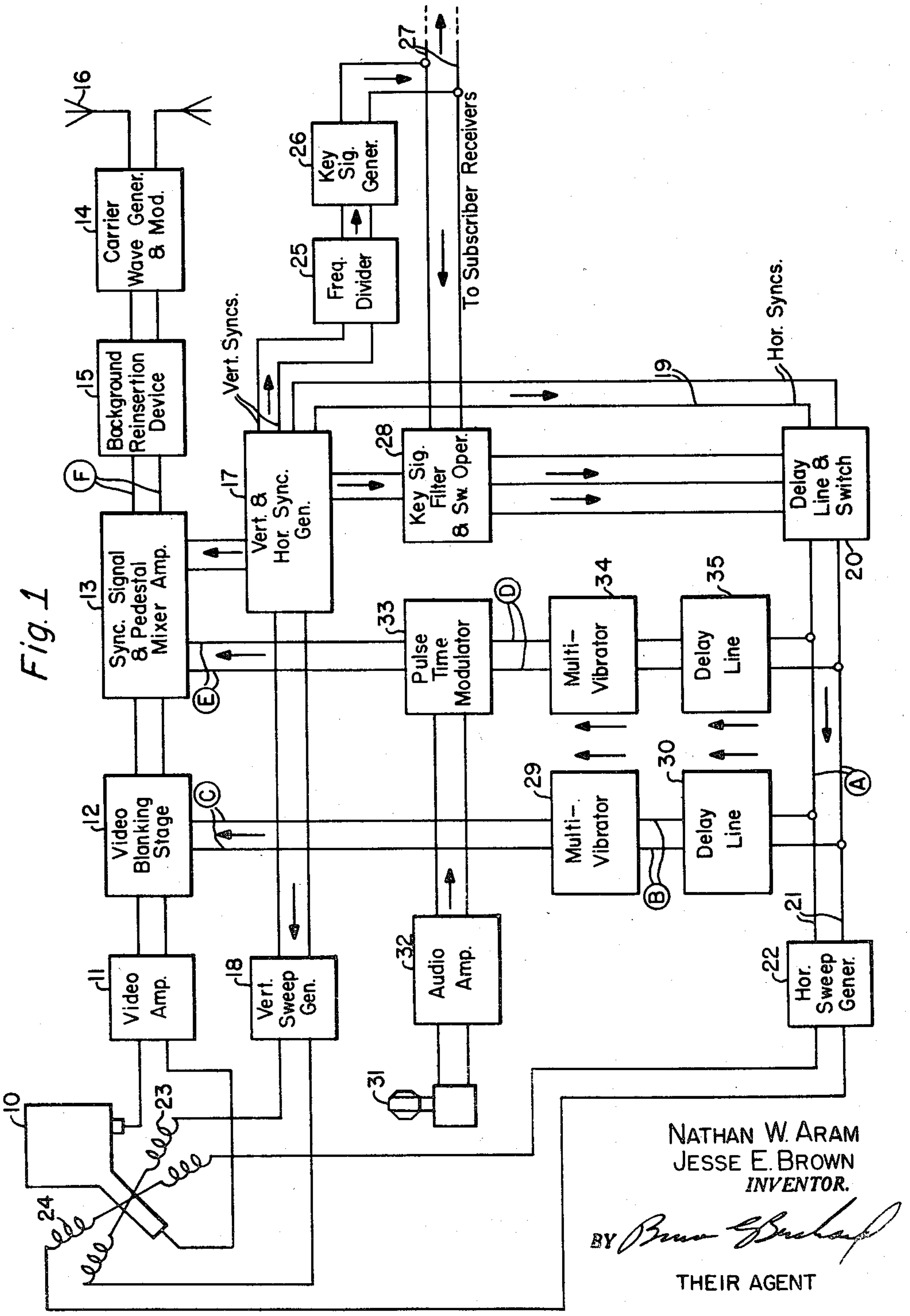

This invention relates to coded signalling systems of the subscription type, and more particularly to such systems in which coded television signals are transmited to subscriber receivers over a first signal channel, and key signals for decoding the coded television signals are transmitted to these receivers over a second signal channel.

Copending application Serial No. 742,374, Ellett et al., filed April 18, 1947, entitled "Radio Wire Signalling System," which has now issued as Patent 2,510,046, May 30, 1950, and copending application Serial No. 773,848, Roschke, filed September 17, 1947, now Patent No. 2,547,598, granted April 3, 1951, entitled "Image Transmission System," both assigned to the present assignee, disclose subscription type television systems in which television signals are radiated to subscriber receivers in coded form, and key signals for decoding the coded television signals are transmitted to these receivers over a line circuit, some means being provided in the line circuit for recording the time of use of the key signals by respective subscriber receivers so that a suitable charge may be made therefor.

In the system disclosed in the abovementioned Roschke application, coding of the television signal is effected by transmitting this signal alternately in two distinct modes. In the first, or normal, mode the video-frequency components of the television signal have a certain time relation with respect to the line synchronizing-signal components, and in the second mode the timing of the video-frequency components is changed so that these components have an altered time relation with respect to the line synchronizing-signal components. The system in this Roschke application is so arranged that changes from one mode to the other of the television signal take place at random times; and, in addition these changes are caused to occur during field-retrace intervals to avoid distortion of the image represented by the television signal. A key signal is transmitted over a line circuit to subscriber receivers to indicate the times of changes in the television signal from one mode to the other so that suitable correcting circuits may be actuated at the receivers to compensate for such changes in mode and, hence, to decode the television signal. Thus, the transmitted composite television signal has synchronizing-signal components having a fixed time relation in the television signal, and also has video-frequency components having a time relation with respect to the synchronizing-signal components that changes when the transmission of the television signal is altered from one mode to the other.

In copending application Serial No. 31,345, Reeves, filed, June 5, 1948, entitled "Subscriber Transmission System," and assigned to the present assignee, it is pointed out that in the Roschke system the alterations of the time relation between the video-frequency components and the line synchronizing-signal components of the composite television signal cause the picture content of each frame of the television signal to vary from mode to mode, and that these changes in picture content cause a slight flicker in the image reproduced at the receiver. The Reeves system provides a circuit at the subscription transmitter for producing "jittering" and blanking pulses having an amplitude approximately equal to the average amplitude of the video-frequency components of the television signal for blanking a portion of the video information at the edge of each frame. The time relation of these "jittering" pulses with respect to the synchronizing-signal components is altered concurrently with the time alteration of the video-frequency components as the transmission of the composite signal is changed from one mode to the other. As fully described in the Reeves application, these blanking pulses act to equalize the picture content of the frames in both modes of transmission, and effectively remove the flicker from the reproduced image. In accordance with the present invention the sound-signal components of the televised image are modulated on these "jittering" blanking pulses. Since these pulses have their timing altered as the television signal is changed from one mode of transmission to the other, the sound portion of the television signal is effectively coded, in addition to the picture components.

It is, therefore, an object of this invention to provide a coded television system of the subscription type in which a composite television signal is coded with such complexity that reception by unauthorized receivers is rendered extremely difficult, if not impossible.

Another object of this invention is to provide such a system of an improved type in which not only the picture components of the composite television signal are coded, but in which the sound-program of the televised scene is also transmitted in coded form as further modulation components of the composite television signal.

Yet another object of this invention is to provide a subscriber receiver capable of decoding and reproducing the picture and sound components of the composite television signal coded in a predetermined manner.

Figure 2:
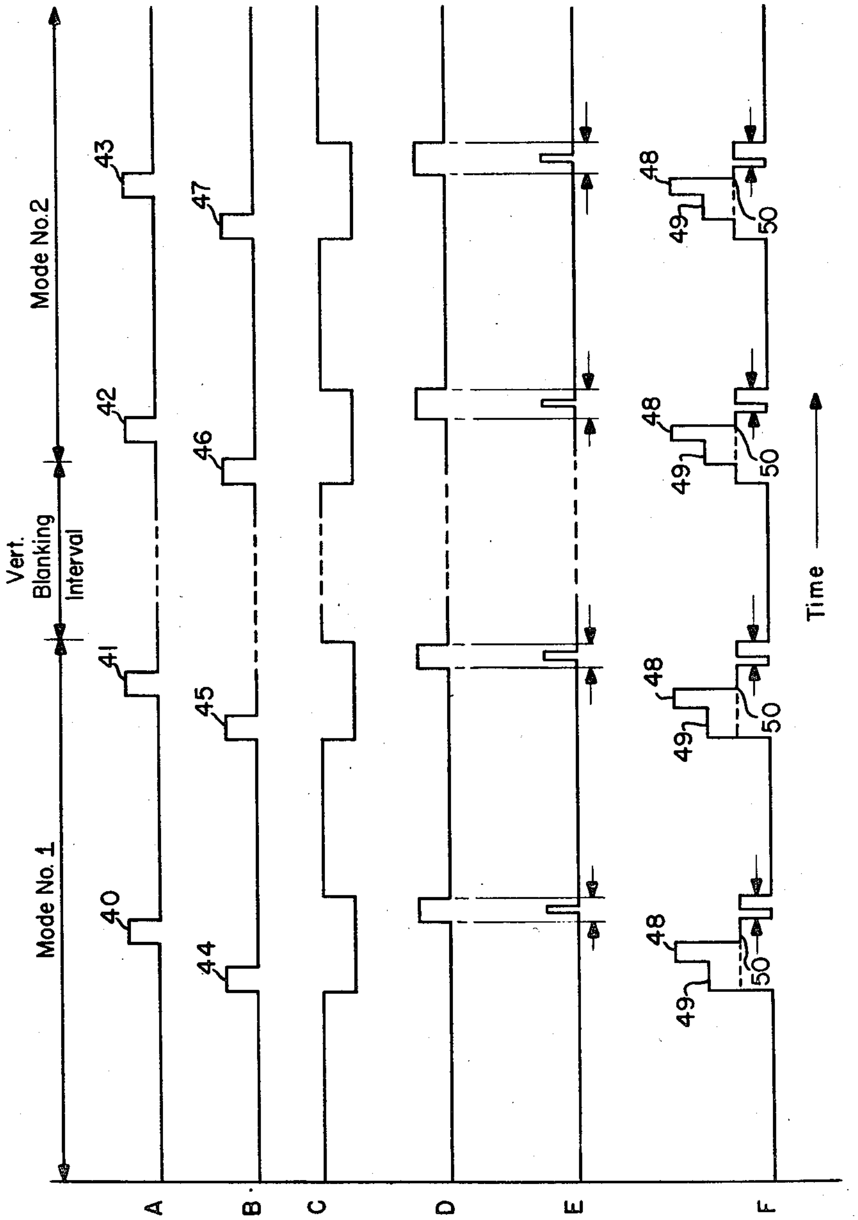
Figure 3:
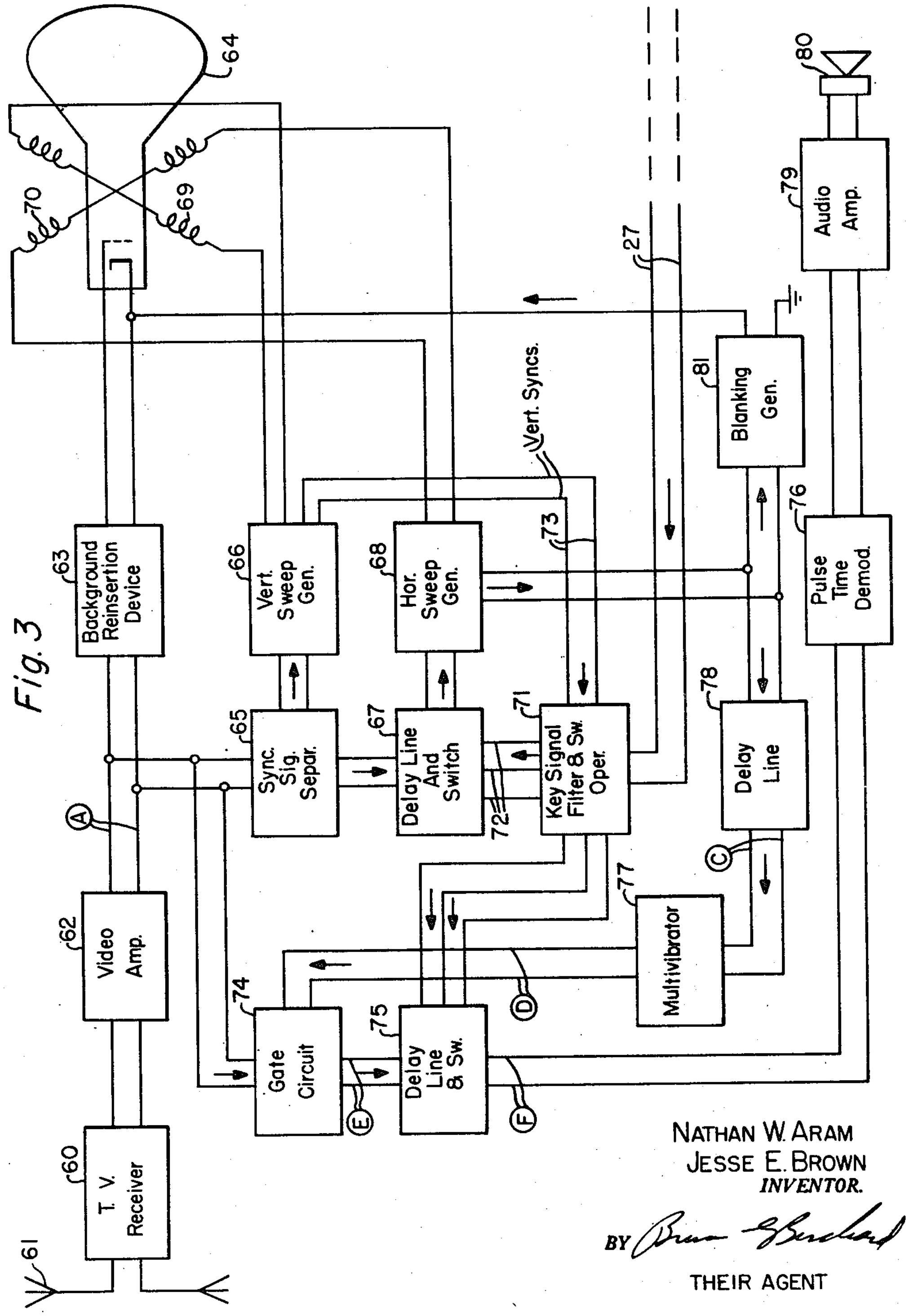
Figure 4:
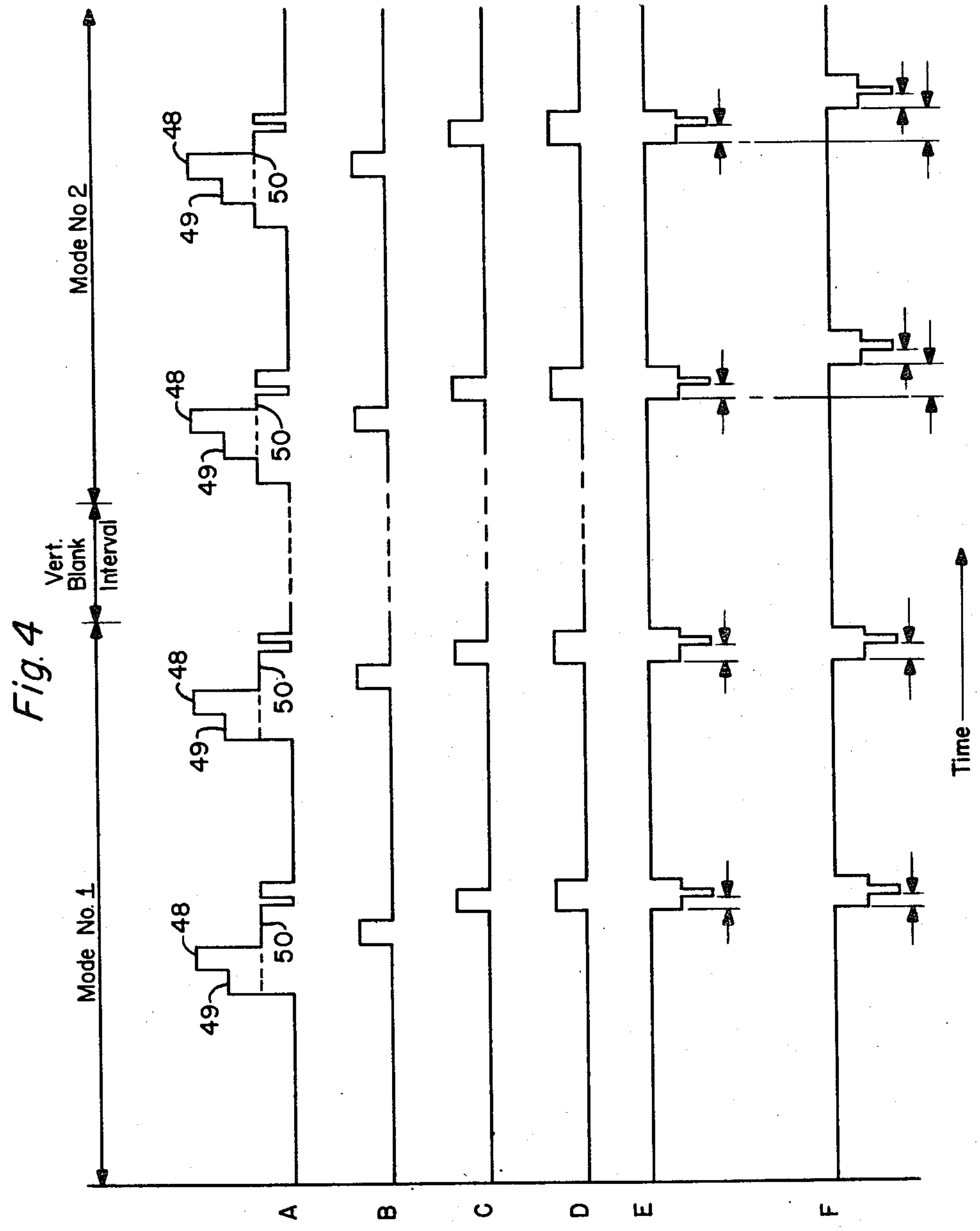

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows a television transmitting system of the subscription type incorporating the present invention, Figure 2 shows various curves used in explaining the operation of the system of Figure 1, Figure 3 shows a subscriber television receiver for decoding and reproducing the signal in the transmitter of Figure 1, and, Figure 4 shows various timing diagrams useful in understanding the operation of the system of Figure 3.

Referring now more particularly to Figure 1, the television transmitter there represented includes a picture-converting device 10 of the iconoscope, image orthicon or other suitable type. The device 10 is coupled to a video amplifier 11 which, in turn, is coupled through a video-blanking stage 12 to a synchronizing signal and pedestal mixer amplifier 13. The mixer 13 is coupled to a carrier-wave generator and modulator 14 through a usual background reinsertion device 15, and the carrier-wave generator and modulator 14 may be connected to a suitable antenna 16. A vertical and horizontal synchronizing signal and pedestal-pulse generator 17 is connected to the mixer 13, and this stage is also connected to a usual vertical sweep generator 18. The stage 17 is also connected by way of leads 19, a delay line and switch 20, and leads 21 to a horizontal sweep generator 22. The vertical and horizontal sweep generators are connected respectively to the vertical and horizontal sweep coils 23 and 24 of device 10. The generator 17 is also coupled to a frequency divider 25 which is connected to a key-signal generator 26, and the generator 26 is connected to a line circuit 27 which extends to the subscriber receivers.

The delay line and switch 20 is actuated by a key-signal filter and switch operator 28, this operator being coupled to stage 17 and to the line circuit 27. The input terminals of a multivibrator 29 are connected through a delay line 30 to the leads 21 from the delay line and switch 20, the output terminals of the multivibrator being connected to the video-blanking stage 12. An audio-signal transducer 31 is connected to the input terminals of an audio amplifier 32, the output terminals of which are connected to a pulse-time, or pulse-position, modulator 33. The output terminals of the pulse-time modulator 33 are connected to the synchronizing signal and pedestal mixer 13. A multivibrator 34 has its input terminals connected through a delay line 35 to the leads 21 from the delay line and switch 20, and has its output terminals connected to the modulator 33.

In the operation of this system, video-frequency signals representing a scanned subject are generated by the device 10, and these signals are amplified in the video amplifier 11. The amplified video-frequency signals are passed through the blanking stage 12 to the mixer amplifier 13 wherein they are mixed with appropriate vertical and horizontal synchronizing signals and blanking pedestals. The output signal from the mixer amplifier 13 is applied to the background reinsertion device 15, wherein this signal is properly adjusted as to background level, and is then applied to the stage 14 in which it is modulated on a suitable carrier wave and then radiated from the antenna 16.

Vertical scanning of the device 10 is controlled by the vertical-sweep generator 18 which supplies a sweep signal to its vertical-deflecting coils 23. The generator 18 is synchronized by means of vertical-synchronizing pulses from the generator 17. Horizontal scanning of the device 10 is controlled by the horizontal-sweep generator 22 which supplies a sweep signal to the horizontal-deflecting coils 24. The generator 22 is synchronized by means of horizontal-synchronizing pulses from generator 17 supplied thereto through the delay line and switch 20 which is under the control of the switch operator 28. The switch operator 28, in the presence of a time coincidence of a vertical-synchronizing pulse from generator 17 and a burst of key signal from the key-signal generator 26, actuates the delay line and switch 20 from one position in which the horizontal-synchronizing pulses are passed thereby with no time delay, to a second position in which the horizontal-synchronizing pulses are time delayed by a certain predetermined amount. The key-signal generator 26 is triggered by frequency divided vertical synchronizing pulses from the frequency divider 25. This frequency divider may, when so desired, be of the random type disclosed in copending application Serial No. 32,457, in the name of Roschke, entitled "Random Frequency Divider" and assigned to the present assignee. Hence, the timing of the horizontal-sweep generator is altered from a normal state to a delayed state at spaced time intervals determined by the bursts of key signal from the generator 26. In this manner the scanning of the device 10 is delayed during spaced intervals and the television signal is, therefore, transmitted in two modes, one in which the video-frequency components have a certain time relation with the horizontal synchronizing-signal components and a second in which the video-frequency components have a different time relation with respect to the synchronizing-signal components. Due to the requirement of time coincidence of a vertical-synchronizing pulse and a key signal burst to actuate the operator 28, changes in the transmission of the television signal from one mode to the other occur only during field-retrace intervals, and hence distortion in the image represented by this signal is avoided. Key signal bursts from the key signal generator 26, indicating the times of such changes of mode of transmission of the television signal, are transmitted to subscriber receivers over the line circuit 27 that extends thereto. The system as thus far described is fully disclosed in the Roschke application Serial No. 773,848, wherefore a further description thereof, or a detailed description of the various component parts is believed to be unnecessary.

The slight flicker that may arise in the reproduced image when a subscriber receiver utilizes the coded television signal transmitted by a subscription transmitter of the type described is eliminated by means of the video-blanking stage 12. As disclosed in the Reeves' application Serial No. 31,345, this blanking stage may blank the video signals passing therethrough at any desired intervals, and produce in their stead a series of blanking pulses. The blanking effect produced by the stage 12 is timed by the multivibrator 29 which, in turn, is triggered by horizontal-synchronizing pulses from the delay line and switch 20, these pulses being time delayed in the delay line 30. In this manner the blanking pulses developed in the stage 12 are caused to occur at appropriate intervals and their timing is altered each time the transmission of the television signal changes from one mode to the other.

The multivibrator 34 produces pulses that are passed through the pulse-time modulator 33 to the mixer stage 13. This multivibrator is triggered by horizontal-synchronizing pulses from the delay line and switch 20 applied thereto through the delay line 35. The time delay exhibited by the delay line 35 is made such that the multivibrator 34 is triggered at the correct intervals to produce pulses at the mixer stage 13 through the pulse-time modulator 33 at the proper time intervals to coincide with the blanking pulses from the stage 12. This time coincidence of the pulses from the modulator 33 and from the blanking stage 12 is not altered with changes in the mode of transmission of the television signal, since both the modulator and the blanking stage 12 are controlled by horizontal-synchronizing pulses from the delay line and switch 20.

Audio signals from the transducer 31 are amplified in the amplifier 32 and are impressed on the pulse-time modulator 33 wherein they alter the timing of the pulses passing therethrough in accordance with the audio intelligence. Therefore, the pulses impressed by the pulse-time modulator on the mixer 13 have their timing altered in accordance with the audio intelligence and further have their timing altered as the transmission of the television signal changes from mode to mode. Consequently, the television signal passed by the mixer stage 13 to the carrier-wave generator and modulator stage 14 is coded with great complexity, since it contains picture components that are in coded form and since it further contains audio, or sound, components that are also in coded form.

Reference is now made to Figure 2 for a more detailed description of the operation of the transmitter of Figure 1. The wave form of curve 2A represents the horizontal-synchronizing pulses after they have passed through the delay line and switch 20, the pulses being designated 40, 41, 42 and 43. These pulses have a certain timing in mode No. 1 wherein the delay line and switch 20 is assumed to introduce a delay in the translation of these pulses and they have a changed timing during mode No. 2 wherein the delay line and switch passes the pulses with no delay. As previously stated, the change from mode No. 1 to mode No. 2 occurs during a field- or vertical-retrace blanking interval, as indicated in Figure 2. It is pointed out that the generator 17 of Figure 1 continues to generate horizontal-synchronizing pulses during the vertical-blanking intervals and supplies these pulses to the delay line and switch 20 in a continuous manner.

The pulses represented in curve 2A are impressed on the multivibrator 29 through the delay line 30, the pulses from the delay line 30 being shown in the curve 2B as the pulses 44, 45, 46 and 47. The pulse 44 corresponds to the horizontal-synchronizing pulse, not shown, preceding the pulse 40 in curve 2A, the pulse 45 corresponds to the pulse 40, the pulse 46 corresponds to a horizontal-synchronizing pulse, not shown, occurring in the vertical-retrace interval, and the pulse 47 corresponds to the pulse 42 in curve 2A. The pulses in curve 2B trigger the multivibrator 29 and the resulting output pulses from the multivibrator are shown in curve 2C. As previously stated, this triggering of the multivibrator 29 continues during the vertical-blanking intervals due to the pulses supplied thereto from the delay line and switch 20 and the delay line 30.

The pulses in curve 2A are also passed through the delay line 35 to the multivibrator 34 and the output pulses from this multivibrator are shown in curve 2D, the triggering of the multivibrator 34 similarly continuing during the vertical-blanking intervals. The pulses from the multivibrator 34 are supplied to the pulse-time modulator 33 wherein they are modulated in accordance with audio intelligence from the audio amplifier 32, and the output pulses from the modulator 33 are shown in curve 2E, these pulses being pulse-time modulated with respect to the leading edge of the pulses in the curve 2D, regardless of the position of these latter pulses.

The curve 2F represents the horizontal-synchronizing signal as it appears in the mixer amplifier 13. This signal consists of horizontal-synchronizing pulses 48 generated by the generator 17, these pulses being superimposed on blanking pedestals 49 also generated by the generator 17. The pulses from the multivibrator 29, as shown in curve 2C, operate the video blanking stage 12 to blank the video signals passing therethrough at certain intervals and provide "jittering" blanking pulses during these intervals. These blanking pulses are shown in curve 2F at 50 and, as shown, they have their timing altered relative to the pedestals 49 and the horizontal-synchronizing pulses 48 whenever the transmission of the television signal changes from mode No. 1 to mode No. 2. The time-modulated pulses in curve 2E are supplied to the mixer amplifier 13 and being of opposite polarity appear as slots in the blanking pulses 50, as shown in curve 2F. The modulated pulses have their timing relative to the pulses 50 altered in accordance with the audio signals represented thereby, and furthermore these pulses are coded since their timing (relative to pulses 48) is additionally altered, concurrently with the blanking pulses 50 as the transmission changes from mode to mode. During vertical-blanking intervals, the "jittering" pulses 50 do not appear in the transmitted television signal, and the time-modulated pulses of curve 2E appear, during these intervals, as slots in the vertical blanking signal. The vertical-synchronizing pulses are positioned on vertical-synchronizing signals in conventional manner so that they do not interfere with the time-modulated pulses.

A subscriber receiver for receiving and decoding the television signal transmitted by the transmitter of Figure 1 is shown in Figure 3. This receiver comprises a unit 60 including a radio-frequency amplifier, a first-detector, an intermediate frequency amplifier and a second detector connected in cascade as in conventional television receivers. The input terminals of this unit 60 may be connected to a suitable antenna 61, and the ouput terminals thereof are connected to a video amplifier 62. The video amplifier 62 is coupled through a usual background-reinsertion device 63 to a receiver image tube 64 or any other type of reproducing device. The video amplifier 62 is also connected to a synchronizing-signal separator 65, this circuit being connected directly to a vertical-sweep generator 66, and through a delay line and switch 67 to a horizontal-sweep generator 68. The output terminals of the sweep generator 66 and 68 are connected, respectively, to the vertical-deflecting coils 69 and horizontal-deflecting coils 70 of the reproducing device 64. The delay line and switch 67 is operated by a key-signal filter and switch operator 71 connected thereto by means of leads 72, this operator being actuated by the coincidence of a vertical-synchronizing pulse from the vertical sweep generator 66 on leads 73 and a burst of key signal on the line circuit 27 extending to the receiver from the transmitter of Figure 1. The video amplifier 62 is also connected through a gate circuit 74 and through a delay line and switch 75 to a pulse-time demodulator 76, the gate circuit being actuated by a multivibrator 77 connected to the horizontal-sweep generator 68 through a delay line 78. The output terminals of the pulse-time demodulator 76 are connected to an audio amplifier 79, which in turn is connected to a sound reproducing device 80. The horizontal-sweep generator 68 is also connected to a blanking generator 81, which may be similar to that disclosed in copending application Serial No. 74,821, filed February 5, 1949, entitled "Subscription Type Signal Translating Apparatus" by Richard O. Gray, and assigned to the present assignee. The output terminals of the blanking generator 81 are connected between ground and one of the input electrodes of the device 64.

In the operation of this receiver, the composite television signal from the transmitter of Figure 1 is received on the antenna 61. This signal is amplified and detected in the receiver 60 and the detected signal is then amplified in the video amplifier 62. The amplified video signal from the amplifier 62, properly adjusted as to background level in the device 63, is used to control the intensity of the cathode-ray beam in the device 64, in the usual manner. The synchronizing-signal components of the received television signal are removed therefrom by the separator circuit 65, the vertical synchronizing signals being impressed by this circuit directly on the vertical-sweep generator 66 to synchronize this generator, and hence the vertical scanning of the device 64, to the vertical-synchronizing frequency of the received signal. Horizontal-synchronizing signals are impressed on the horizontal-sweep generator 68 through the delay line and switch 67, and synchronize this generator, and hence the horizontal scanning of the device 64, to the horizontal-synchronizing frequency of the received signal. As previously pointed out, the video-frequency components of the transmitted television signal are delayed relative to the synchronizing-signal components thereof at spaced time intervals as the signal changes from the first to the second mode to effect coding of the television signal, and the times of occurrence of these changes in mode are indicated by bursts of key signal on the line circuit 27.

At the transmitter a burst of key signal is sent out over the line circuit 27 and is concurrently impressed on the key-signal filter and switch operator 28 of Figure 1, this operator being actuated by the next succeeding vertical-synchronizing pulse from generator 17 occurring after the initiation of the key-signal burst. This burst is received at the receiver over the line circuit and may be delayed slightly due to an inherent time delay in this circuit. However, there is no change in mode of transmission of the signal until the next vertical synchronizing pulse following the initiation of the burst is generated at the transmitter, and this burst is, therefore, received at the receiver before this change in mode at the transmitter is initiated. The burst of key signal received over line 27 is impressed on the switch operator 71, and the next vertical-synchronizing pulse on leads 73, which corresponds to the above mentioned next succeeding vertical synchronizing pulse generated at the transmitter, causes the operator 71 to actuate the delay line and switch 67. Therefore, this actuation occurs simultaneously with the change in mode of the received signal, and also during a vertical retrace interval to avoid distortion in the reproduced image. Therefore, at each of the above mentioned changes in mode when the video-frequency components of the television signal are delayed with respect to the horizontal synchronizing-signal components at the transmitter, the delay line and switch 67 causes the horizontal scanning of the image tube 64 to be simultaneously delayed and, hence, enables the device to reproduce correctly the transmitted image. The operation of the receiver thus far described is fully discussed in the aforementioned Roschke application, together with a detailed description of the various components thereof.

To avoid edge flicker in the reproduced image, the blanking generator 81 is provided, this blanking generator being actuated by horizontal-synchronizing pulses from the horizontal sweep generator 68 and producing blanking pulses at its output. Whenever the timing of the horizontal-sweep generator 68 is altered due to the actuation of the delay line and switch 67, the timing of the blanking pulses from the generator 81 is concurrently altered. As fully described in the previously mentioned Gray application, the blanking pulses from the generator 81 may be adjusted to blank the device 64 during any desired portions of the normal trace intervals of this device, these portions varying as the received subscription television signal changes from mode to mode. Generator 81 may, therefore, be adjusted to blank portions of the normal trace intervals of the device 64 and "edge flicker" in the reproduced image may be eliminated thereby.

The time-modulated pulses that were multiplexed on the received subscription television signal at transmitter are removed therefrom in the following manner: The detected and amplified television signal from the video amplifier 62 is passed through the gate circuit 74 to the delay line and switch 75. The gate circuit 74 is operated by the multivibrator 77 which, in turn, is operated by horizontal-synchronizing pulses from the horizontal sweep generator 68 delayed in the delay line 78. The multivibrator 77 and the delay line 78 are so constructed that the gate circuit is opened for intervals corresponding to the occurrence of the time-modulated pulses in the received television signal. Since the multivibrator 77 is actuated by horizontal pulses from the horizontal-sweep generator 68, the timing of this multivibrator is altered each time there is a change in mode in the received signal. This is due to the fact that the timing of the horizontal-sweep generator changes simultaneously with such changes in mode. Therefore, regardless of the mode of transmission of the television signal, the gate circuit is correctly timed to select only such portions of this signal that contain the time-modulated pulses.

During the vertical-blanking intervals, as previously pointed out, the time modulated pulses appear on the vertical blanking pulses. The horizontal-sweep generator 68 continues to oscillate during these intervals and the gate circuit 74 continues to be opened at the proper times to select only the portion of the received signal which contains the time-modulated pulses. As a result, there appears at the output of the gate circuit 74 a periodic pulse wave which contains two time modulations, a first that represents the audio-signal components of the received television signal, and a second that represents the change in timing of the television signal from the first to the second mode of transmission. The second modulation is compensated by means of the delay line and switch 75, this delay line and switch being operated by the operator 71 to delay the pulses passing therethrough when the received television signal is in one mode and to pass the pulses directly when the received television signal is in the second mode. The construction of the delay line and switch 75 is made such that the pulses appearing at its output have only the time modulation representing the audio intelligence. The pulses from the delay line and switch 75 are demodulated in the pulse-time demodulator 76, this demodulator being unresponsive to amplitude changes of these pulses so that the time-modulated pulses conveyed by the "jittering" blanking pulses and by the vertical-blanking pulses receive identical treatment. The resulting audio signals from the demodulator 74 are amplified in the audio amplifier 79 and are reproduced in the device 80.

Reference is now made to Figure 4 for a more detailed description of the operation of the receiver of Figure 3. The curve 4A shows the horizontal-synchronizing signal transmitted by the transmitter of Figure 1 and received by the receiver of Figure 4. As in curve 2F, this signal includes horizontal-synchronizing pulses 48, horizontal-blanking pedestals 49 and the "jittering" blanking pulses 50, these latter pulses changing in time with respect to the pedestals and synchronizing pulses as the transmission of the television signal changes from mode No. 1 to mode No. 2. As shown, the time-modulated pulses representing the audio-signal component of the television signal are impressd on the "jittering" blanking pulses 50 and these time-modulated pulses also move concurrently with these blanking pulses as the mode of transmission of the television signal changes. As previously stated, during the vertical-blanking intervals the time-modulated pulses are impressed on the vertical-blanking pedestal, not shown. The horizontal-synchronizing pulses 48 are removed from the signal shown in curve 4A by the separator circuit 65, and are then supplied to the horizontal-sweep generator 68 through the delay line and switch 67. The pulses impressed on the delay line 78 from the horizontal sweep generator 68 are shown in curve 4B, and these pulses are delayed therein and appear at the output thereof with the timing indicated in curve 4C. The pulses in curve 4B have a certain delayed time relationship with respect to the horizontal-synchronizing pulses 48 of curve 4A when the transmission of the television signal is in mode No. 1 since the delay line and switch 67 is in a condition to delay these pulses. In mode No. 2, the pulses of curve 4B are in phase with the corresponding horizontal-synchronizing pulses 48 of curve 4A since the delay line and switch 67 is in a condition to pass these latter pulses with no delay.

The pulses of curve 4C are impressed on the multivibrator 77 and the pulse output of the multivibrator is shown in curve 4D. The delay line 78 and the multivibrator 77 are so constructed that the gate circuit 74 is opened at the correct intervals to pass the time-modulated pulses from the received signal to the delay line and switch 75. The timing of the operation of the gate circuit 74 is altered each time the mode of the received television signal changes so that the time-modulated pulses are passed thereby regardless of the mode of the television signal. The time-modulated pulses impressed on the delay line and switch 75 are shown in curve 4E and these pulses additionally have their timing altered each time the mode of the received signal changes. The delay line and switch 75 is actuated simultaneously with the delay line and switch 67 and imparts to the time-modulated pulses passing therethrough a compensating time delay during the mode No. 2 intervals so that the pulses supplied to the pulse-time demodulator 76 are time modulated solely with the audio intelligence and unaffected by any change in mode in the received television signal. These time-modulated pulses which are supplied to the demodulator 76 are shown in curve 4F.

This invention provides, therefore, a subscriber television system in which a television signal is coded with great complexity by changing at spaced time intervals the time relation between the video-frequency components and the synchronizing-signal components of the composite television signal, and in which the television signal is further coded by impressing its audio-signal components on a blanking pulse thereof which also has its time relation relative to the synchronizing-signal components altered during the spaced time intervals.

While a certain embodiment of the invention has been shown and described, modifications may be made thereof. It is intended in the appended claims to cover all such modifications as fall within the true spirit and scope of the invention.

We claim:

1. A subscription type of television receiver for utilizing a composite television signal received over a first signal channel and including a video-signal component, a synchronizing-signal component and an audio-signal component, the timing of said components with respect to two of the third being altered during spaced time intervals, and for utilizing a key signal received over a second signal channel and indicating said spaced time intervals; said receiver including: an input circuit for receiving the television signal; an image reproducing device and an associated scanning system; means coupled to said input circuit for supplying said video-signal component and said synchronizing-signal component to said image reproducing device and to said scanning system; a sound reproducing device; a sound channel coupled to said input circuit for supplying said audio-signal component to said sound reproducing device; control apparatus coupled to said scanning system and to said sound channel and responsive to said key signal for producing a compensating alteration in the timing of the components of said television signal during said spaced time intervals; and means for receiving said key signal from said second channel and for supplying the key signal to said control apparatus.

2. A subscription type of television receiver for utilizing a composite television signal received over a first signal channel and including a video-signal component, a synchronizing-signal component and an audio-signal component, the timing of said video-signal component and said audio-signal component with respect to said synchronizing-signal component being altered during spaced time intervals, and for utilizing a key signal received over a second signal channel and indicating said spaced time intervals; said receiver including: an input circuit for receiving the television signal; an image reproducing device and an associated scanning system; means coupled to said input circuit for supplying said video-signal component and said synchronizing-signal component to said image reproducing device and to said scanning system; a sound reproducing device; a sound channel coupled to said input circuit for supplying said audio-signal component to said sound reproducing device; control apparatus coupled to said scanning system and to said sound channel and responsive to said key signal for producing a compensating alteration in the timing of said video-signal component and said audio-signal component with respect to said synchronizing-signal component during said spaced time intervals; and means for receiving said key signal from the second channel and for supplying the key signal to said control apparatus.

3. A subscription type of television receiver for utilizing a composite television signal received over a first signal channel and including a video-signal component, a synchronizing-signal component and an audio-signal component, the timing of said video-signal component and said audio-signal component with respect to said synchronizing-signal component being altered during spaced time intervals, and for utilizing a key signal received over a second signal channel and indicating said spaced time intervals; said receiver including: an input circuit for receiving the television signal; an image reproducing device and an associated scanning system; means coupled to said input circuit for supplying said video-signal component and said synchronizing-signal component to said image reproducing device and to said scanning system; a sound reproducing device; a sound channel coupled to said input circuit, including a gate circuit controlled by said scanning system, for supplying said audio-signal component to said sound reproducing device; control apparatus coupled to said scanning system and to said sound channel and responsive to said key signal for producing a compensating alteration in the timing of said video-signal component and said audio-signal component with respect to said synchronizing-signal component during said spaced time intervals; and means for receiving said key signal from the second channel and for supplying the key signal to said control apparatus.

4. A subscription type of television receiver for utilizing a composite television signal received over a first signal channel and including a video-signal component, a synchronizing-signal component and an audio-signal component, said audio-signal component being in the form of a modulated periodic pulse wave and having its timing altered concurrently with said video-signal component with respect to said synchronizing-signal component during spaced time intervals, and for utilizing a key signal received over a second signal channel and indicating said spaced time intervals; said receiver including: an input circuit for receiving the television signal; an image reproducing device and an associated scanning system; means coupled to said input circuit for supplying said video-signal component and said synchronizing-signal component to said image reproducing device and to said scanning system; a sound reproducing device; a sound channel coupled to said input circuit, including a gate circuit controlled by said scanning system, for supplying said modulated periodic pulse wave to said sound reproducting device; control apparatus coupled to said scanning system and to said sound channel and responsive to said key signal for producing a compensating alteration in the timing of said video-signal component and said audio-signal component with respect to said synchronizing-signal component during said spaced time intervals; and means for receiving said key signal from the second channel and for supplying the key signal to said control apparatus.

5. A subscription type of television receiver for utilizing a composite television signal received over a first signal channel and including a video-signal component, a synchronizing-signal component and an audio-signal component, said audio-signal component being in the form of a time modulated periodic pulse wave further having its timing altered concurrently with said video-signal component with respect to said synchronizing-signal component during spaced time intervals, and for utilizing a key signal received over a second signal channel and indicating said spaced time intervals; said receiver including: an input circuit for receiving the television signal; an image reproducing device and an associated scanning system; means coupled to said input circuit for supplying said video-signal component and said synchronizing-signal component to said image reproducing device and to said scanning system; a sound reproducing device; a sound channel coupled to said input circuit, including a gate circuit controlled by said scanning system for supplying said time modulated periodic pulse wave to said sound reproducing device; control apparatus coupled to said scanning system and to said sound channel and responsive to said key signal for producing a compensating alteration in the timing of said video-signal component and said audio-signal component with respect to said synchronizing-signal component during spaced time intervals; and means for receiving the key signal from the second channel and for supplying the key signal to said control apparatus.

NATHAN W. ARAM.
JESSE E. BROWN.

REFERENCES CITED

The following references are of record in the file of this patent:

UNITED STATES PATENTS

| Number | Name | Date |
|---|---|---|
| 2,403,059 | Dillenback | July 2, 1946 |
| 2,405,252 | Goldsmith | Aug. 6, 1946 |
| 2,437,300 | Labin | Mar. 9, 1948 |
| 2,448,908 | Parker | Sept. 7, 1948 |
| 2,472,774 | Mayle | June 7, 1949 |
| 2,477,625 | Labin | Aug. 2, 1949 |
| 2,477,679 | Young | Aug. 2, 1949 |
| 2,502,213 | Fredendall | Mar. 28, 1950 |
| 2,521,010 | Homrighous | Sept. 5, 1950 |

Certificate of Correction

Patent No. 2,563,448 August 7, 1951

NATHAN W. ARAM ET AL.

It is hereby certified that error appears in the printed specification of the above numbered patent requiring correction as follows:

Column 10, line 47, after "of", first occurrence, insert *two of*; same line, after "to" strike out "two of";

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*